United States Patent
Tam (10) Patent No.: US 6,512,889 B1
(45) Date of Patent: Jan. 28, 2003

(54) CAMERA BACK FOR A CAMERA

(76) Inventor: Sze Leung Tam, 1688 Flatbush Ave., Brooklyn, NY (US) 11210

( * ) Notice: Subject to any disclaimer, the term of this patent is extended or adjusted under 35 U.S.C. 154(b) by 0 days.

(21) Appl. No.: 09/672,356

(22) Filed: Sep. 28, 2000

(51) Int. Cl.[7] .......... G03B 13/24; G03B 17/44; G03B 17/26; G03B 17/50
(52) U.S. Cl. .......... 396/151; 396/359; 396/360; 396/511; 396/536; 396/39
(58) Field of Search .......... 396/360, 511, 396/535, 536, 541, 446, 437, 359, 151, 39, 518

(56) References Cited

U.S. PATENT DOCUMENTS

| | | | |
|---|---|---|---|
| 2,549,670 A | * 4/1951 | Dalton | 396/151 |
| 4,023,191 A | 5/1977 | Augustin, Jr. et al. | 396/39 |
| 4,523,824 A | * 6/1985 | Gfeller et al. | 396/151 |

OTHER PUBLICATIONS

Rotary Backs, Horseman Brochure, Komamura Corporation (undated).
System Modules, Horseman Brochure, Komamura Corporation (undated).
Camera Backs, Toyo Brochure, Sakai Special Camera MFG. Co., Ltd. (undated).

* cited by examiner

*Primary Examiner*—David M. Gray
*Assistant Examiner*—Rochelle Blackman
(74) *Attorney, Agent, or Firm*—Gerald T. Bodner (57) ABSTRACT

A camera back having a frame for receiving a camera component and a locking arm pivotally connected to the frame. The locking arm includes an engagement surface for holding the camera component securely to the frame. The locking arm comprises a top and bottom locking member pivotally mounted to the frame with a handle connecting the top and bottom locking members. A biasing element urges the engagement surface against the frame in a downward position to securely hold the camera component in the frame. A tension device is attached to the frame so that after the camera component is locked into place on the camera back, the tension device effectively holds the locking arm in one position to avoid inadvertent unlocking. In a method for releasably attaching a camera component to the back of a camera, a locking arm having an engagement surface is pivoted so that it is out of engagement with a frame and the camera component can then be placed in the frame and then securely locked in place when the locking arm is pivoted back into the locked position.

12 Claims, 8 Drawing Sheets

CAMERA BACK FOR A CAMERA

BACKGROUND OF THE INVENTION

1. Field of the Invention

The present invention relates generally to a camera back for large format cameras, otherwise known as view cameras, and more particularly to a locking mechanism for changing various attachments used with the camera back.

2. Description of the Prior Art

The large format camera, or view camera, has been in use for many years. Its relatively unchanged design from the turn of the century is still widely used by professional and amateur photographers even with the advent of the digital camera and convenient automatic cameras. The advantage of using a large format camera is that the film surface is much larger than that of an automatic camera, and its clarity is much sharper than a digital camera. Accordingly, higher quality pictures that can be enlarged with greater ease are achievable with large format cameras.

Digital backs have now been introduced to be attached to the large format camera to take advantage of the clarity characteristics that are inherent with a large format camera. These digital backs allow the large format camera to take digital pictures while still maintaining the advantage of having a large film surface to take clear pictures.

The large format cameras typically have a camera back attachment that is secured to the camera body itself. The camera back is used as the actual interface between the camera body and the ground glass and later the film.

However, in order to understand the use of the camera back, the process of taking an actual picture must be explained. First, the camera body itself must be set up to face the subject to be photographed. Second, the camera must be focused. In order to focus the camera, the ground glass attachment must be used. The ground glass attachment is merely a piece of glass with a rough surface on the inside and an imprint of either a grid or a cross-hairs image to aid in positioning the camera. The ground glass is typically attached to the camera back using a commonly known sliding lock back.

The sliding lock back is the standard back that is used on almost all of the large format cameras in use today. The sliding lock back has two sliding locks, one on the top and one on the bottom that are engaged by sliding the locks in one direction to engage the attachment. Specifically, the locking mechanism is two sliding flat pieces of metal attached to the camera back. The flat pieces of metal have protrusions on the edge to grip the item placed in the camera back when engaged. The pieces of metal are attached to the camera back with two screws each. The pieces of metal are guided by the screws to only move in a diagonal direction to either engage or disengage an item in the camera back. In this instance the ground glass is held in place by sliding the locks into the engaged position.

Once the ground glass is locked in place, the camera shutter is opened so that the image of the subject is projected onto the ground glass. The photographer then focuses the camera so that the image on the ground glass is precisely what will be photographed. It is important that the camera is properly focussed, as the quality of the image on the ground glass is exactly what will be photographed on the film. The shutter is then closed and the ground glass is unlocked from the sliding lock back by disengaging the two locks and then the film is loaded.

The film for the large format camera can be stored in a variety of formats, such as a magazine that holds two or more sheets of film flat, a rolled film type cartridge, an instant development type film holder or a digital back. Each type of film is unique in its own way, however, each film must be attached to the camera back in the same manner. Specifically, the film is attached to the camera back in the same manner as the ground glass, so the process of loading the film is exactly the same as loading the ground glass.

It is extremely important that the camera stay absolutely still while removing the ground glass and inserting the film. Since, any movement of the camera may cause the camera to no longer be in focus on the proper subject. After the film is properly inserted in the camera and then locked into place using the sliding lock back the picture may then be taken.

The inherent problem with the sliding lock back is that there are two opportunities for the camera to move, namely, when the ground glass is removed and when the film is loaded. During both instances, the sliding lock back has to be either engaged or disengaged using two separate sliding locks on the camera back. The locking process requires the photographer to remove both hands from stabilizing the camera to then disengage or engage the locks and to then remove or insert the ground glass or film.

When the photographer removes both hands from the camera, the chances of the camera being inadvertently shaken or moved is greatly increased. In addition, the act of having to unlock or lock a separate top and bottom lock with no hands on the camera body itself further increases the chances of the camera moving.

One camera back design has attempted to solve the problem of requiring the release of the locks before loading the film. In this design, the ground glass is attached to the sliding lock back, however, in order to load the film the locks do not have to be disengaged. Instead, the ground glass is attached to the camera back using a spring loaded hinge mechanism. This mechanism allows the ground glass to be held firmly in place while focussing. When the image is focussed, a cartridge type film or instant development type film can be inserted between the ground glass and the camera back. The ground glass hinge pivots so that the film cartridge is then held in place between the ground glass and the camera back. This design eliminates the problem of using two hands to load or remove the ground glass and film, however it creates a new problem. Since the ground glass is connected by a spring loaded hinge, one must push the film between the ground glass and the camera back to overcome the tension on the spring itself. The act of pushing the film in shakes the camera since considerable force must be applied to load the film. In addition, the spring loaded ground glass design does not allow the rolled type film or digital back to be loaded. Thus, the film must be loaded by first removing the spring loaded ground glass attachment.

In order to overcome the inherent problems with both designs, it would be desirable to have a locking camera back that could be operated with one hand on the camera at all times thus reducing the chances of the camera moving. Furthermore it would be desirable to have a locking mechanism that locks the film or ground glass to the camera back and does not require either excessive force or the separate acts of engaging and disengaging multiple locks.

OBJECTS AND SUMMARY OF THE INVENTION

It is an object of the present invention to provide a simple and convenient locking camera back for a large format camera.

It is a further object of the present invention to provide a locking camera back with multiple locks that are operated simultaneously by one mechanism.

It is still a further object of the present invention to provide a lock for a camera back that, when engaged and disengaged, firmly holds components of the camera, but does not require excessive force or manipulation.

In accordance with one form of the present invention, the camera back generally includes a frame for receiving a camera component and a locking arm pivotally connected to the frame with an engagement surface for holding a camera component securely to the frame. Preferably the locking arm is attached to the frame with mounting blocks with the locking arm biased into a locked position by a compression spring. The locking arm preferably comprises a top and a bottom locking member positioned parallel to the top and bottom frame members with the locking members connected by a handle. Compression springs are attached between the handle and the frame to push the handle in an upward position. A tension device is attached to the frame so that after the camera component is locked into place on the camera back, the tension device effectively maintains the locking arm in a locked position to avoid inadvertent unlocking. The locking arm in the preferred embodiment of the invention is pivotally mounted so that the locking arms are positioned inside the outer peripheral edge of the frame. Alternatively, the locking arms are pivotally mounted to the outside peripheral edge of the frame. In another alternate embodiment the locking arms have an engagement surface that is bent inward toward the center of the frame so that the camera component can be securely held in place.

A method for releasably attaching a camera component to the back of a camera preferably including the steps of pivoting a locking arm having an engagement surface out of engagement with a frame formed on the camera back and placing the camera component within the frame. The locking arm is then released so that the engagement surface holds the camera component securely in the frame.

A preferred form of a camera back for a camera and method of use, as well as other embodiments, objects, features and advantages of the invention will be apparent from the following detailed description of illustrative embodiments thereof which is to be read in conjunction with the accompanying drawings.

DETAILED DESCRIPTION OF THE PREFERRED EMBODIMENTS

Figure 1:
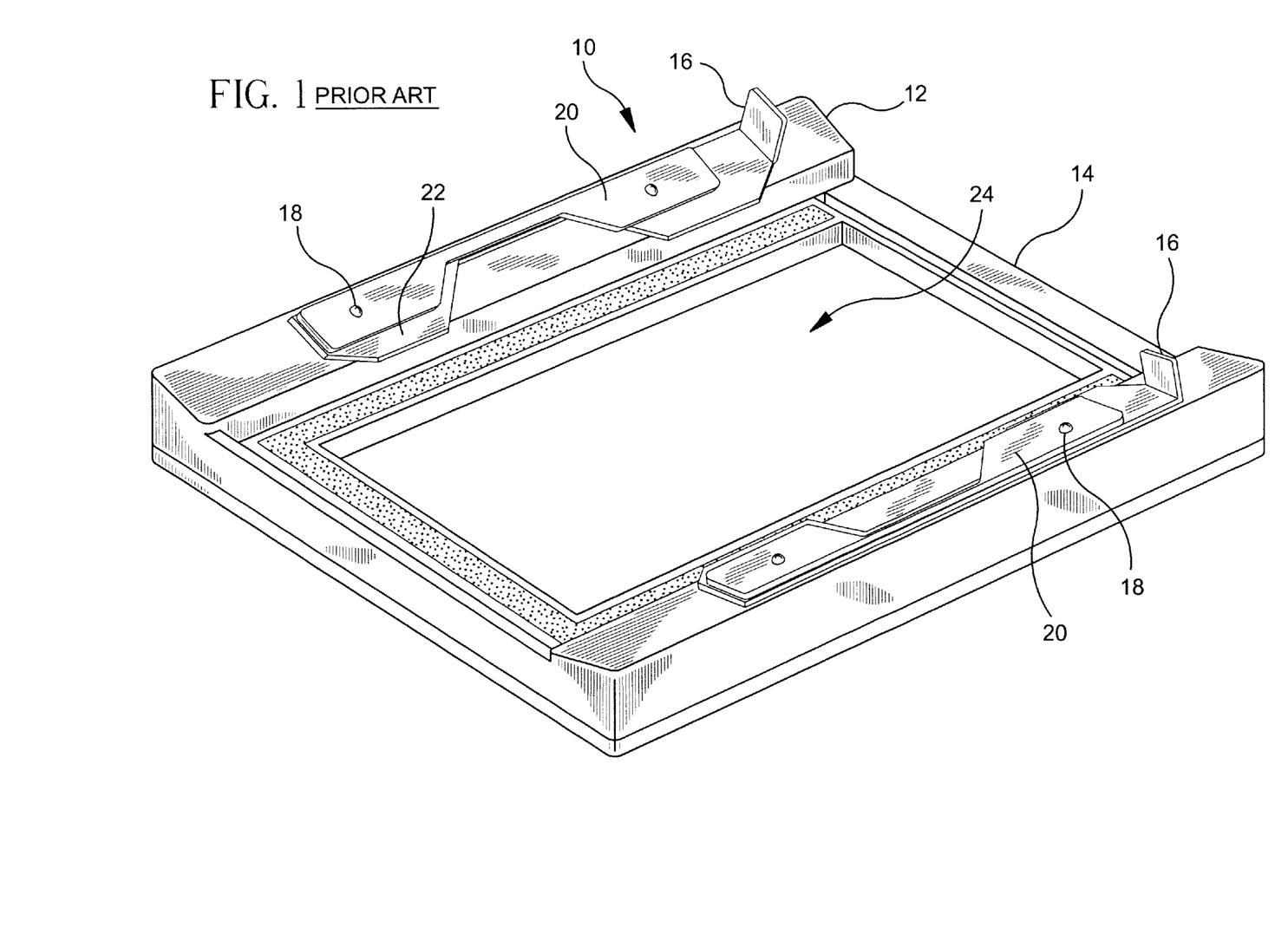
FIG. 1 is a perspective view of a camera back of the prior art.
Figure 2:
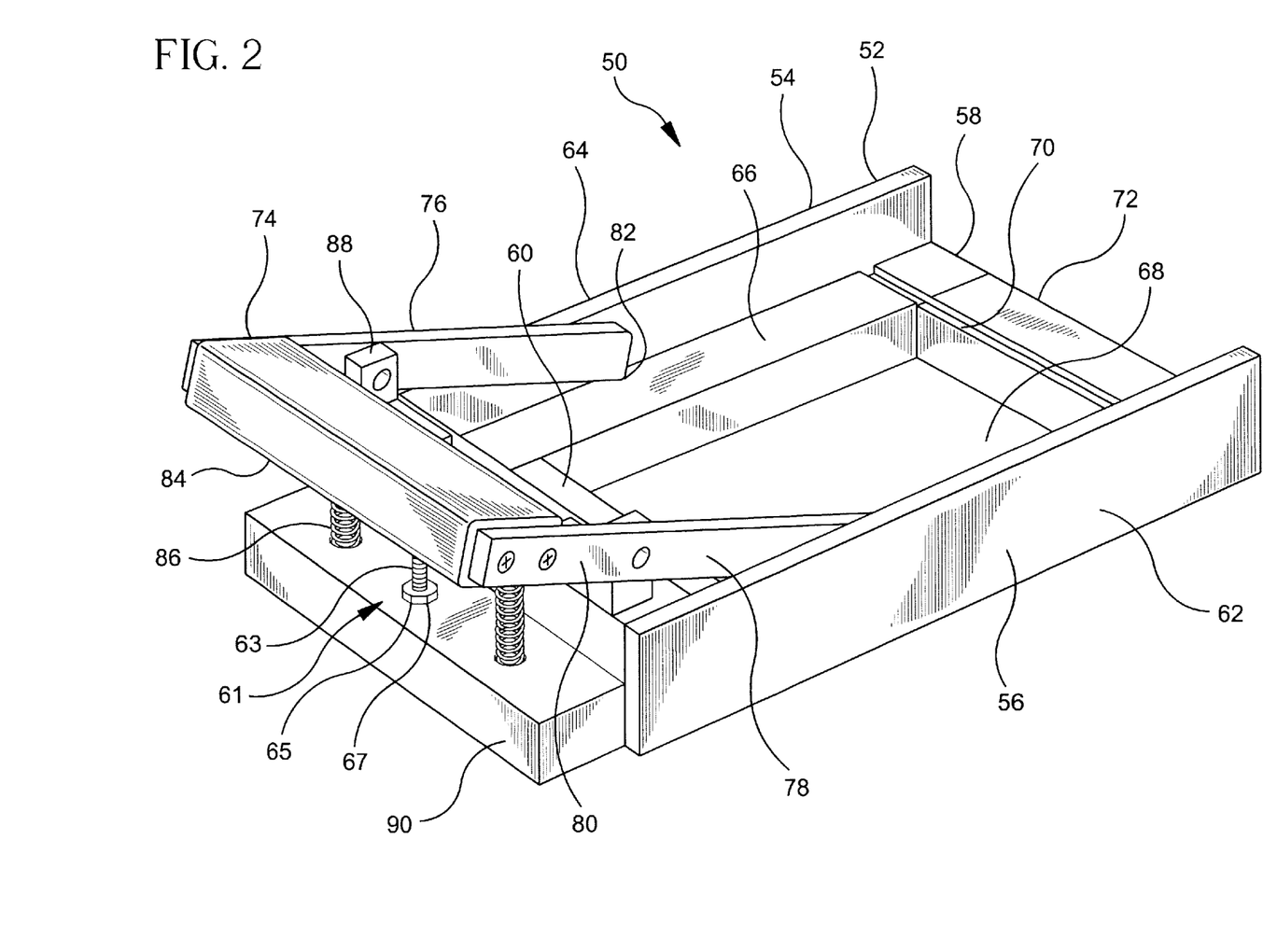
FIG. 2 is a top perspective view of a preferred embodiment of a camera back formed in accordance with the present invention.

Referring to FIG. 1, a prior art camera back 10 is shown. The camera back 10 comprises a body 12 with a receiving recess 14 for accepting various camera back attachments. The camera back 10 has two sliding locks 16 attached with screws 18 and a locking plate 20. The locks 16 have protrusions 22 that engage the camera back attachments. In order to lock the camera back 10 to an attachment, the locks 16 are pushed in a leftward direction, whereby the locks 16 move in both a leftward horizontal direction and toward a central opening 24 in the body 12. The protrusions 22 then engage the camera attachment to hold it in place. In order for the camera back 10 to hold the attachment, both of the locks 16 must be locked by manipulating both the top lock and the bottom lock. One disadvantage of the prior art is that by separately locking the top and bottom lock, the camera is prone to shaking.

A preferred embodiment of the present invention is shown in FIGS. 2–8. The camera back 50 of the present invention comprises a frame 52 to hold a camera component. The frame 52 has a top member 54 and a bottom member 56 both with a top surface 66. The top member 54 and bottom member 56 are substantially parallel to each other. A right member 58 and a left member 60 connect the top member 54 and bottom member 56 to form the frame 52. The right member 58 and left member 60 are positioned perpendicular to the top member 54 and bottom member 56. The frame 52 forms a substantially rectangular shape having an outer surface 62 along the peripheral edge of the frame 52. An outer lip 64 extends upward from the top surface 66 of the top member 54 and the bottom member 56. The outer lip 64 is preferably positioned so that it is an upward extension of the outer surface 62 along the peripheral edge of the top 54 and bottom member 56. The frame 52 and the outer lip 64 together form a recess 68 so that the camera component may be held in the frame 52.

Preferably, a groove 70 is disposed in a top surface 72 of the right member 58 to assist in holding the camera components. Camera components typically have a lip extending from their surface that may interface with the groove 70 to securely hold the camera component in the camera back 50.

The camera back 50 further comprises a locking arm 74 that is pivotally attached to the frame 52 to hold the camera component securely against the frame 52. In the preferred embodiment, the locking arm 74 comprises a top locking member 76 and a bottom locking member 78 which both have a handle end 80 at one end and an engagement surface 82 at the opposite end. The top locking member 76 and the bottom locking member 78 are connected by a handle 84 at the handle end 80 of the locking members which holds the locking members substantially parallel to each other. In the preferred embodiment, the locking members are pivotally mounted to the frame 52 so that the engagement surfaces 82 contact the top surfaces 66 of the frame 52 when the handle 84 is in an upward position away from the frame 52. The locking arm 74 has at least one biasing element 86, preferably in the form of a compression spring, having one end attached to the locking arm 74 and the other end attached to the frame 52. The biasing element 86 is mounted so that the handle 84 is biased in an upward position, whereby the engagement surfaces 82 exert a downward force toward the top frame member 54 and the bottom frame member 56.

In the preferred embodiment, a tension device 61 is mounted to the frame 52 to exert an upward force on the locking arm 74. The tension device 61 effectively maintains the locking arm 74 in a locked position so that it may not be inadvertently moved by the user. Preferably, the tension device 61 is in the form of a threaded rod 63 threaded into an aperture 65 in the frame 52 so that the height of the threaded rod 63 may be adjusted to exert the proper amount of force on the locking arm 74 to hold it in place. The threaded rod 63 includes a locking nut 67 to securely hold the threaded rod 63 in place once the height has been selected. An alternate embodiment of the tension device may include a cam device with a lever that is explained later.

Figure 5:
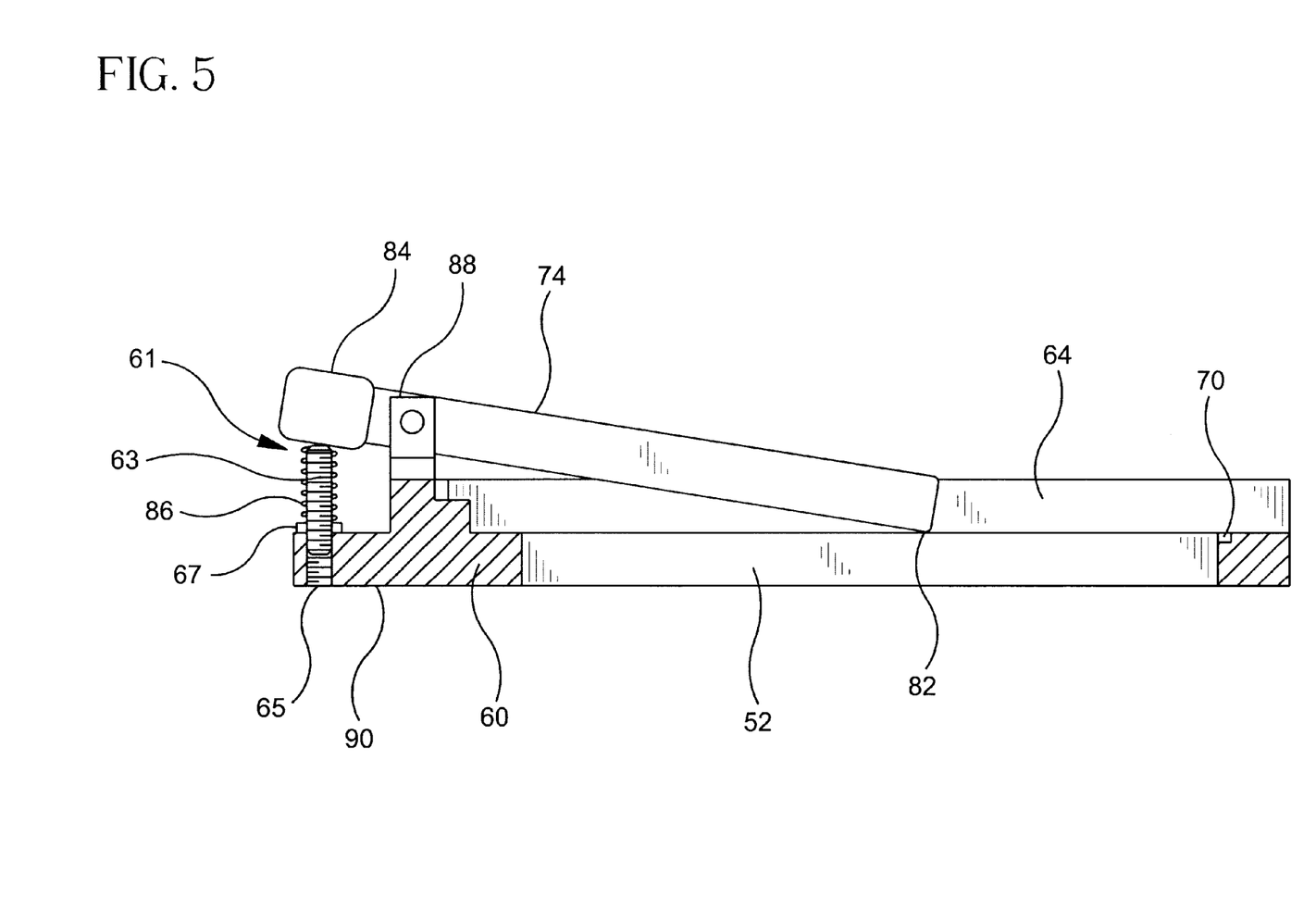
FIG. 5 is a cross section view of FIG. 4 taken along line 5—5.
Figure 6:
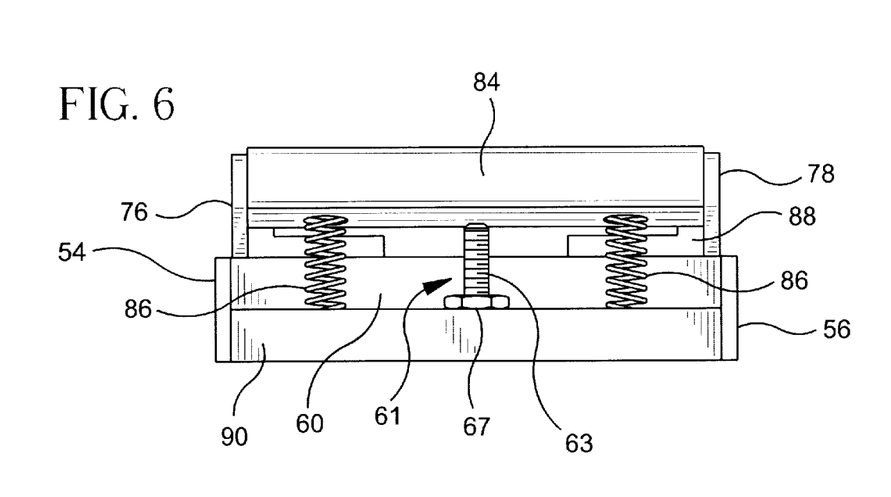
FIG. 6 is a left elevation view of the camera back of FIG. 2.

Referring to FIG. 5, the locking arm 74 is pivotally attached to a mounting block 88 that is securely attached to the frame 52. Preferably, there are two mounting blocks 88 to correspond with the number of locking members of the invention. In the preferred embodiment the left frame member 60 of the frame 52 has an outwardly extending portion 90 for mounting the biasing element 86. FIG. 6 shows the outwardly extending portion 90 and the two biasing elements 86.

Figure 7:
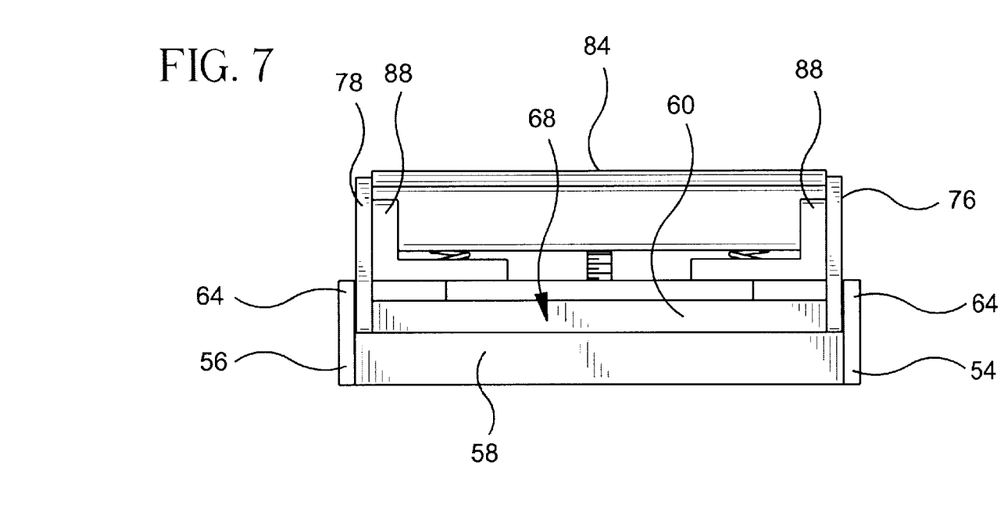
FIG. 7 is a right elevation view of the camera back of FIG. 2.
Figure 8:
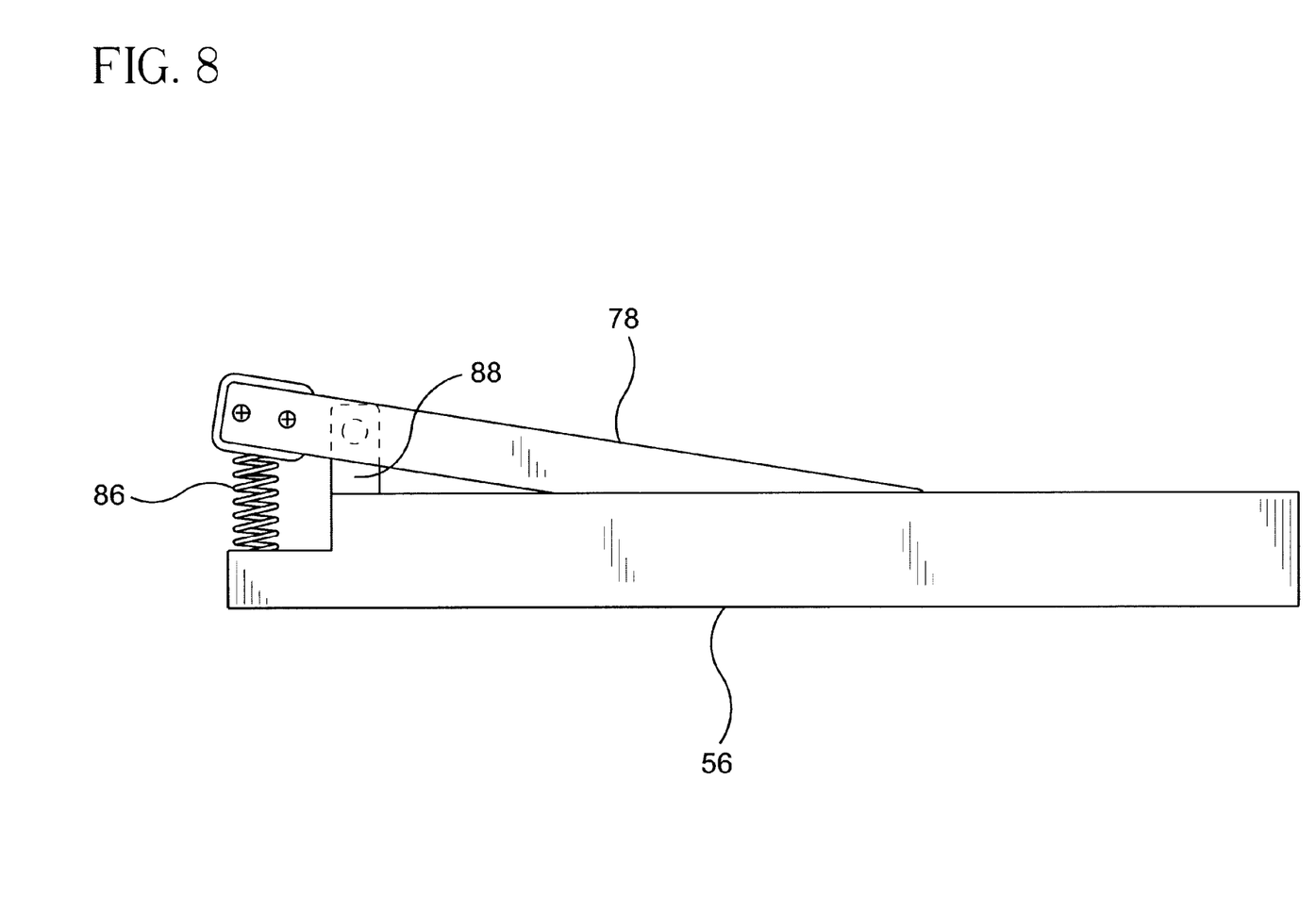
FIG. 8 is a front elevation view of the camera back of FIG. 2.

Referring to FIG. 7, the right side of the frame 52 showing the recess 68 for receiving the camera component is shown. The camera component is inserted into the recess 68 by depressing the handle 84 downward toward the extended portion 90 of the frame, thereby biasing the engagement surfaces 82 of the locking arm 74 away from the top surfaces 66 of the top 54 and bottom member 56. The camera component can then be inserted into the recess 68 while continuing to depress the handle 84. The camera component is inserted into the recess 68 so that the corresponding lip on the camera component correctly aligns with the groove 70 on the right frame member 58. The camera component is then locked into place by releasing the handle 84, whereby the biasing element 86 pushes the handle in an upward position causing the engagement surfaces 82 to contact the camera component and exert a downward force thereon to hold the camera component securely in place. The camera component can be easily removed by reversing the steps of inserting the camera component. Thus, the camera back 50 of the present invention can be operated with one hand stabilizing the camera at all times, while the other hand is removing or inserting the ground glass or camera component.

Figure 3:
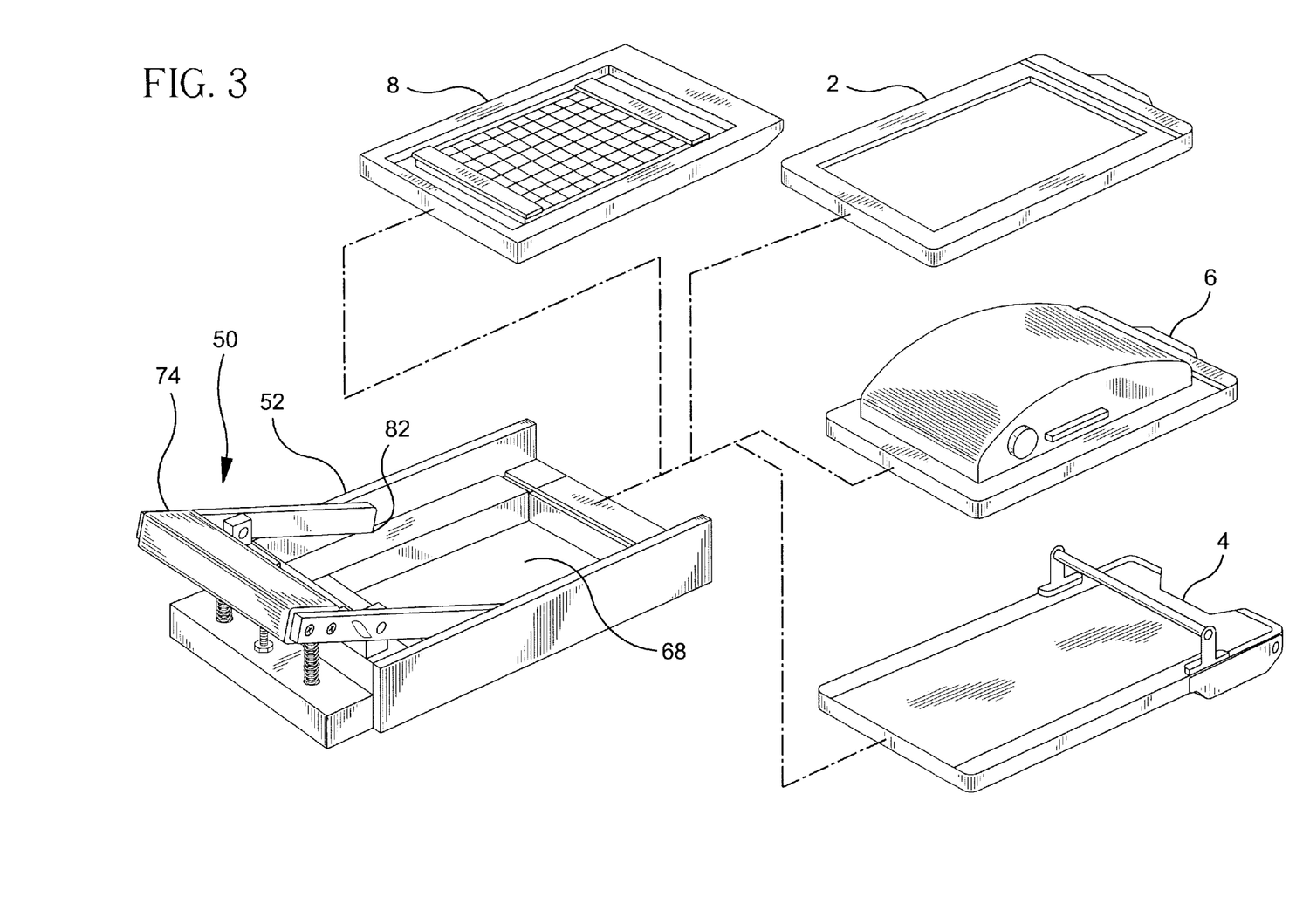
FIG. 3 is a top perspective view of a preferred embodiment of a camera back formed in accordance with the present invention and also showing various components that may be attached to the camera back.
Figure 4:
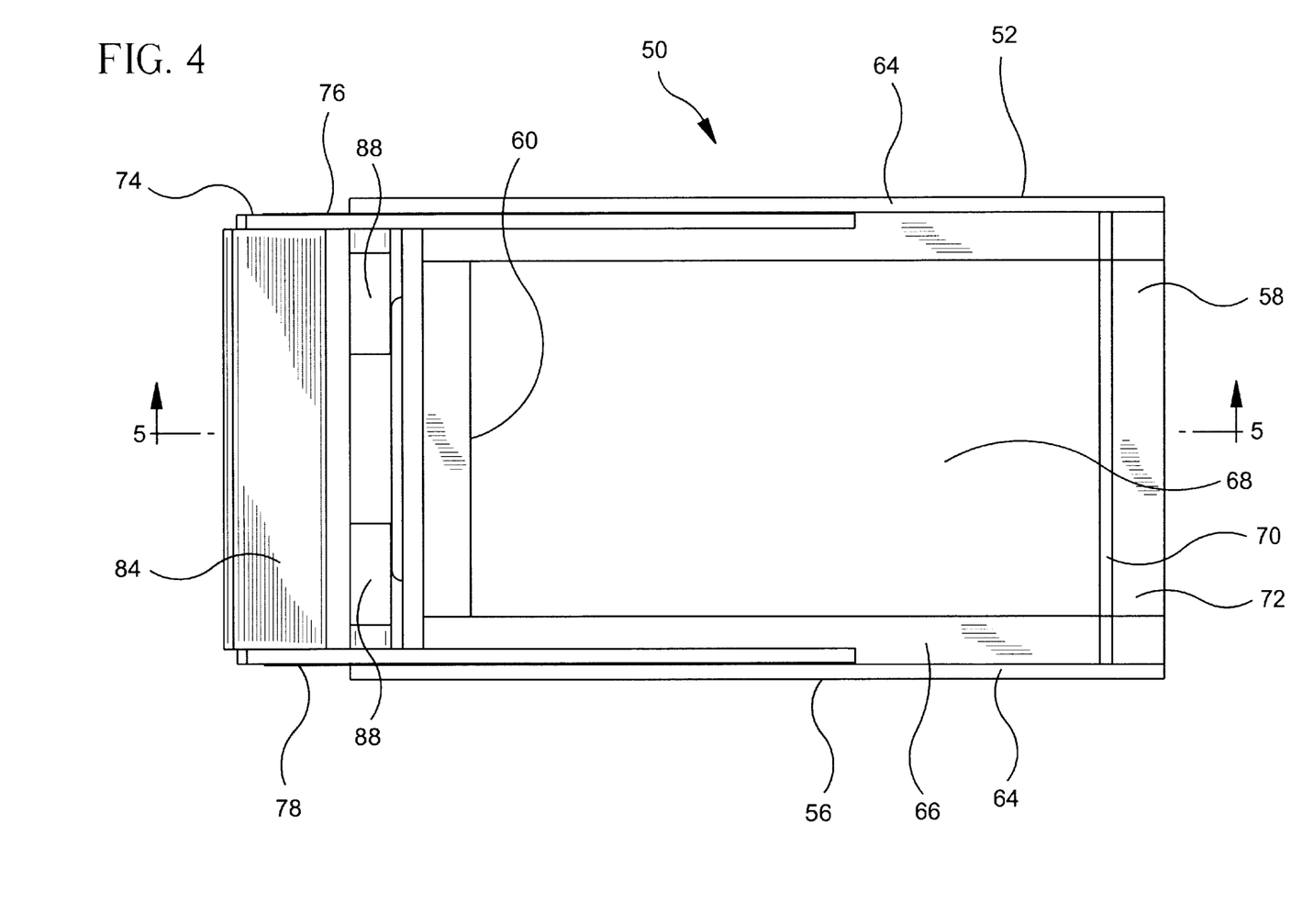
FIG. 4 is a top plan view of the camera back of FIG. 2.

The four most commonly used types of camera components that are attached to the camera back are shown in FIG. 3. A flat film cartridge 2, an instant development film cartridge 4, rolled film 6 and a ground glass component 8 are shown. Each type of component slides easily into the recess 68 in the frame 52 when the locking arm 74 is disengaged. However, when the locking arm 74 is released, the locking arm 74 then securely holds the components in the frame 52 by the engagement surfaces 82 that contact the camera component.

Figure 9:
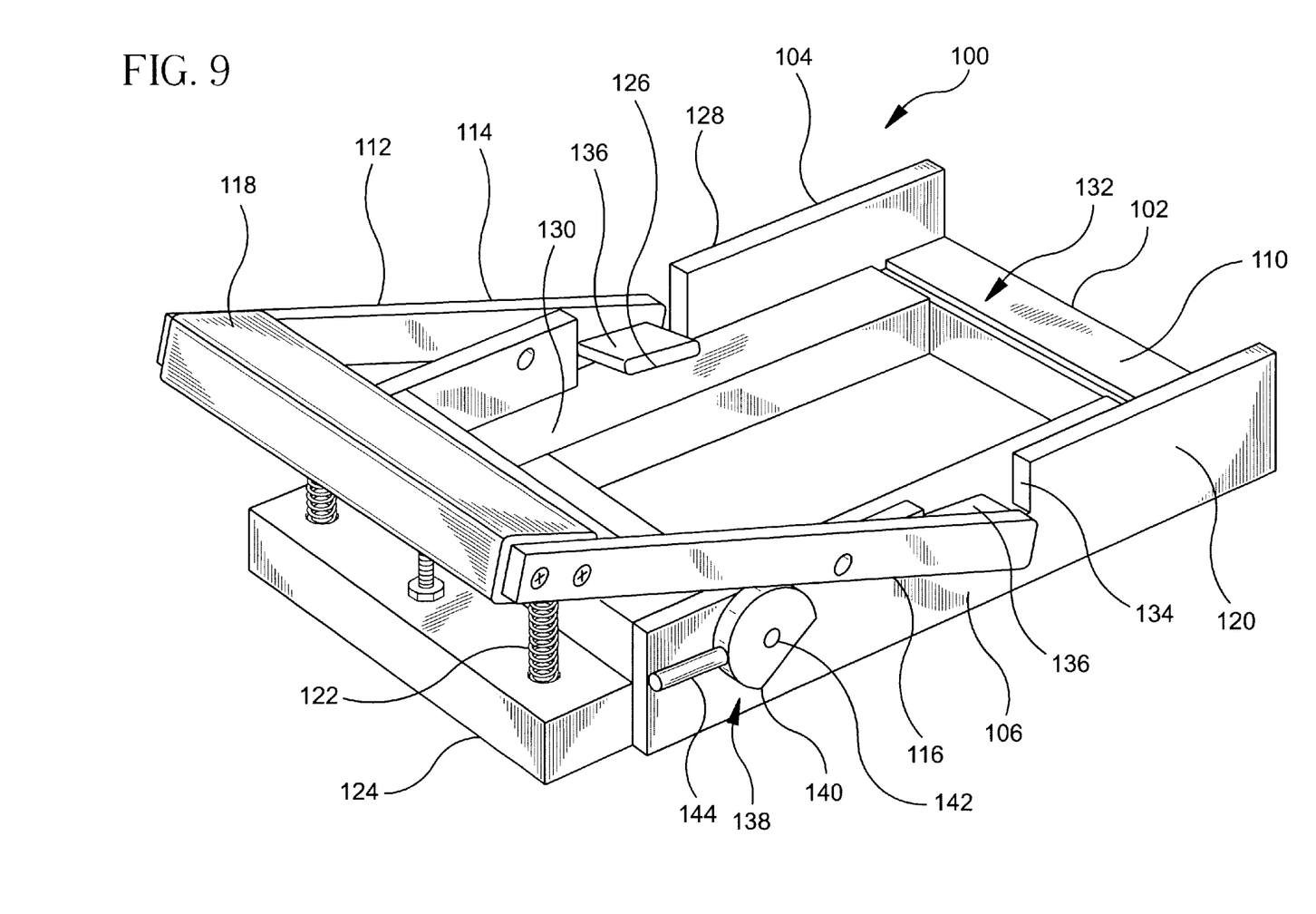
FIG. 9 is a top perspective view of an alternate embodiment of the present invention.

FIG. 9 shows an alternate embodiment of the present invention. In the alternate embodiment the camera back 100 comprises a frame 102 with a top member 104, a bottom member 106, a left member 108 and a right member 110. The frame members are attached to each other to form a rectangular shape with an outer surface 120 along the peripheral edge of the frame 102 and an upper surface 130 on the inside of the frame 102 as described above. However, the locking arm 112 is pivotally attached directly to the frame 102 and comprises a top locking member 114 and a bottom locking member 116 that are positioned parallel to each other and connected at one end by a handle 118. In the alternate embodiment the top locking member 114 and bottom locking member 116 are respectively pivotally attached to the top frame member 104 and bottom frame member 106 on the outer surface 120 of the frame members. Thus, mounting blocks 88 are not required.

The top member 104 and the bottom member 106 include an outer lip 128 that extends upward from the top surface 130 of the top member 104 and the bottom member 106. The outer lip 128 is preferably positioned so that it is an upward extension of the outer surface 120 along the peripheral edge of the top 104 and bottom member 106. The frame 102 and the outer lip 128 together form a recess 132 so that the camera component may be held in the frame 102. A notch 134 is formed in the outer lip 128 of the top 104 and bottom member 106 for receiving inwardly extending portions 136 of the top and bottom locking members 114 and 116.

The inwardly extending portions 136 of the top and bottom locking members 114 and 116 include engagement surfaces 126 to hold the camera component securely in place. The engagement surface 126 of the top locking arm 114 and bottom locking arm 116 are positioned so that they contact the upper surface 130 of the frame 102.

At least one biasing element 122 is attached between an outer extended portion 124 of the left frame member 108 and the handle 118 of the locking arm 112. The biasing element 122 pushes the handle 118 in an upward direction, thus causing the engagement surface 126 of the locking arm 112 to contact the upper surface 130 of the frame 102. An alternate embodiment of the tension device is also shown in FIG. 9. Here, the tension device 138 is in the form of a cam device having a cam shaped member 140 pivotally mounted to the frame 102 by a pivot pin 142. A lever arm 144 is attached to the cam shaped member 140 for rotating the cam shaped member 140 to contact the locking arm 112 and push the locking arm in an upward fixed position, thereby decreasing the chances of inadvertently unlocking the camera back 100. The locking arm 112 operates in a manner similar to that described above to load and remove the camera components.

Although the illustrative embodiments of the present invention have been described herein, it is to be understood that the invention is not limited to those precise embodiments, and that various other changes and modifications may be effected therein by one skilled in the art without departing from the scope and spirit of the invention.

What is claimed is:

1. A camera back for selective attachment of camera components comprising:
   a frame for receiving a camera component; and
   a locking arm including at least one rigid locking member having an engagement end a handle end opposite said engagement end, a pivot point between said engagement end and said handle end and an engagement surface on said engagement end for holding said camera component against said frame, wherein said locking arm is pivotally connected to said frame at said pivot point of said locking member, whereby movement of said handle end of said locking member towards said frame raises said engagement surface away from said frame.

2. A camera back as defined in claim 1, further comprising a biasing element connected to said locking arm for urging said engagement surface against said camera component.

3. A camera back as defined in claim 1, wherein said locking arm comprises a top locking member pivotally connected to a top portion of said frame and a bottom locking member pivotally connected to a bottom portion of said frame, each of said top and bottom locking members having an engagement surface for holding said camera component in said frame.

4. A camera back as defined in claim 3, wherein said locking arm further comprises a handle attached between said top and bottom locking members.

5. A camera back as defined in claim 4, further comprising a biasing element positioned between said handle and said frame for urging said engagement surfaces against said camera component.

6. A camera back as defined in claim 3, further comprising a biasing element positioned between said top and bottom locking members and said frame for urging said engagement surfaces against said camera component.

7. A camera back as defined in claim 1, wherein the frame further comprises:
   a top and bottom frame member each having a top surface; and
   a right and left frame member, perpendicularly connected to said top and bottom frame members,
   wherein said right frame member includes a groove on a top surface thereof extending from the top frame member to the bottom frame member for receiving a mating lip of a camera component.

8. A camera back for selective attachment of camera components comprising:
   a frame for receiving a camera component;
   a locking arm pivotally connected to said frame, said locking arm having a top locking member pivotally connected to a top portion of said frame and a bottom locking member pivotally connected to a bottom portion of said frame, each of said top and bottom locking members having at least one engagement surface for holding said camera component in said frame; and
   a plurality of mounting blocks attached to said frame, wherein said top and bottom locking members are pivotally attached to said mounting blocks.

9. A camera back as defined in claim 1, further comprising an adjustable tension device fixed to said frame for holding said locking arm in a fixed closed position.

10. A camera back for selective attachment of camera components comprising:
    a frame for receiving a camera component;
    a locking arm pivotally connected to said frame, said locking arm having at least one engagement surface for holding said camera component in said frame; and
    an adjustable tension device fixed to said frame for holding said locking arm in a fixed closed position, wherein the adjustable tension device comprises a threaded rod rotatably fixed to said frame, wherein the length of the threaded rod is changed depending on the position of said locking arm.

11. A camera back as defined in claim 9, wherein the adjustable tension device is a cam device that urges the locking arm in an upward locked position, the cam device comprising a cam shaped member pivotally mounted to said frame, whereby said cam shaped member contacts said locking arm when rotated in a locked position, thereby urging said locking arm in an upward position and locking said engagement surface against said camera component.

12. A camera back for selective attachment of camera components comprising:
    a frame for receiving a camera component, said frame having substantially parallel first and second frame members, said first and second frame members each having a notch formed therein; and
    a locking arm having a first locking member pivotally attached to said first frame member, a second locking member pivotally attached to said second frame member and a handle connected between said first and second locking members, said first and second locking members each having a free end and an engagement portion extending from said free end, wherein said engagement portions are seated within said notches of said first and second frame members when the locking arm is in a closed position for holding said camera component against said frame.

* * * * *